United States Patent [19]

Münch et al.

[11] Patent Number: 5,460,894
[45] Date of Patent: Oct. 24, 1995

[54] SUPPORT ARM

[75] Inventors: Udo Münch, Sinn; Markus Neuhof, Ehringshausen, both of Germany

[73] Assignee: Rittal-Werk Rudolf Loh GmbH & Co. KG, Germany

[21] Appl. No.: 306,506

[22] Filed: Sep. 14, 1994

[30] Foreign Application Priority Data

Sep. 14, 1993 [DE] Germany ............... 43 31 424.5

[51] Int. Cl.⁶ ............... F16M 13/00; F16S 3/00; H02G 3/04; G12B 9/08
[52] U.S. Cl. ............ 428/586; 174/68.3; 174/99 R
[58] Field of Search ............... 428/586, 34.1; 174/68.3, 95, 99 R; 248/276, 278

[56] References Cited

U.S. PATENT DOCUMENTS

| | | | |
|---|---|---|---|
| 369,372 | 9/1887 | Turner | 428/586 |
| 590,374 | 9/1897 | Osburn | 174/68.3 |
| 3,110,754 | 11/1963 | Witort et al. | 174/68.3 |
| 3,404,268 | 10/1968 | Fowler | 174/68.3 |
| 3,428,742 | 2/1969 | Smith | 174/99 R |
| 3,520,663 | 7/1970 | Schertel | 428/586 |
| 4,953,821 | 9/1990 | Reuter et al. | 248/276 |
| 4,997,155 | 3/1991 | Reuter et al. | 248/278 |
| 4,998,702 | 3/1991 | Reuter et al. | 248/278 |
| 5,235,136 | 8/1993 | Santucci et al. | 174/68.3 |
| 5,290,612 | 3/1994 | Schuler et al. | 428/34.1 |

FOREIGN PATENT DOCUMENTS

| | | |
|---|---|---|
| 3034013 | 9/1980 | Germany . |
| 3700294 | 1/1987 | Germany . |
| 3805425 | 2/1989 | Germany . |
| 4133144 | 4/1992 | Germany . |
| 4116464 | 3/1993 | Germany . |

OTHER PUBLICATIONS

JANSEN–Profilstahlrohre Catalog, no date.

*Primary Examiner*—John Zimmerman
*Attorney, Agent, or Firm*—Speckman, Pauley & Fejer

[57] ABSTRACT

A support arm for a control device and the like, the hollow profiled walls of which enclose an installation conduit for receiving cables or the like. The support arm, having a simple geometry and great rigidity, comprises a plurality of screw channels which project inwardly and extend in a longitudinal direction of the profiled section and are formed in the installation conduit. The profiled section comprises two lateral walls which are positioned parallel to each other at a distance and are connected at their ends by semicircular connecting elements in the shape of an oval. The screw channels divide the installation conduit into chambers which are spatially connected to each other.

12 Claims, 2 Drawing Sheets

SUPPORT ARM

BACKGROUND OF THE INVENTION

1. Field of the Invention

This invention relates to a support arm having hollow profiled walls which enclose an installation conduit for receiving cables or the like.

2. Description of Prior Art

Such a support arm is taught by German Patent Publication DE 38 05 425. A rectangular support element is connected to a U-shaped profiled base section. The profiled base section can be closed with a cover which can be snapped open, so that a cable conduit is formed. The cost for parts for producing such a support arm is very large.

In the course of assembly, pivot or wall hinges or a control device are fastened to the front end of the support element. As a rule, a support arm is only assembled once, so that it is not necessary to make it easy to replace the cables inserted into the closable conduit, however this does not justify the large costs for parts associated with this support arm. Furthermore, such a hollow profiled section does not have great rigidity. If a weight is placed on a free end of the support arm, for example by fastening a control device there, the support arm bends downward. This results in the operating face of the control device no longer being vertically oriented.

To overcome this disadvantage, German Patent Publication DE 41 16 464 teaches reinforcement of the support element with two diagonal struts inserted in the longitudinal direction. In this support arm, a cable conduit which can be enclosed with a cover is also formed on the support element. The diagonal struts make the support arm even more complex and also increase its cost.

German Patent Publication DE 30 34 013 A1 teaches connecting two hollow profiled sections, which are positioned parallel with respect to each other. The hollow profiled sections themselves are used as a cable conduit. A secure connection of the hollow profiled sections to each other is very expensive. Attaching pivot or wall hinges or control devices or the like on an end of such a support arm is complicated and not sufficiently stable. If several bundles of cables have been placed into the cable conduit, allocating individual strands of the cable at the ends of the hollow profiled sections is not easily accomplished, and a check of the cable has to be performed.

Also known is a support arm having a square hollow profiled section for receiving cables, bundles of cables or the like. These cables, bundles of cables or the like are not maintained in an orderly manner in the support arm and are also not secured.

SUMMARY OF THE INVENTION

It is one object of this invention to provide a support arm of the type discussed hereinabove which, along with having a simple geometry, has a high degree of flexural and torsional strength and in which it is possible to house cables, bundles of cables and the like simply and separate from each other.

This object is achieved by a support arm having screw channels which project inwardly and extend in the longitudinal direction of the profiled section formed in the installation conduit. The profiled section walls are formed by two lateral walls positioned parallel to each other at a distance and are connected at their ends with oval shaped semicircular connecting elements. The screw channels divide the installation conduit into chambers which are in communication with each other.

A high degree of flexural and torsional strength is achieved with the closed and oval cross-sectional shape of the hollow profiled section, which is superior to that of the conventional square hollow profiled section. The vertically oriented lateral walls absorb large bending loads with little sagging. An additional increase in wall strength is achieved due to the screw channels, resulting in additional stiffening of the hollow profiled section. A large connecting face is formed at the ends of the support arm by the screw channels so that pivot or wall hinges or control devices and the like can be attached securely without twisting or tilting. These devices can be simply connected to the hollow profiled section with fastening screws screwed in the screw channels.

Individual cables, bundles of cables or the like can be securely fixed in the support arm's chambers. If several bundles of the same cables are inserted, they can be separately placed in the individual chambers. This eliminates the need for expensive checking of bundles of cables for associating the ends of the bundles of cables at the inlet with the ends of the bundles at the outlet.

In accordance with one preferred embodiment of this invention, the screw channels are formed in transition areas where the lateral walls make a transition into semicircular connecting elements.

The support arm has good support at its connecting surfaces because the screw channels are positioned exactly in the transitional areas. The screw channels are far apart horizontally and vertically, so that large moments can be transmitted in the connecting surface. Chambers at the top or the bottom of the support arm are formed by the semicircular connecting elements, into which chambers the individual bundles of cables can be simply inserted.

To attach additional installation elements to the exterior of the hollow profiled sections, in accordance with another embodiment of this invention groove-like exterior recesses extending in the longitudinal direction of the profiled section are formed by the lateral walls and/or the connecting elements. It is then possible to attach additional hollow profiled sections in parallel, or to attach additional stiffening elements.

In accordance with another preferred embodiment of this invention, outwardly extending protrusions on the lateral walls and/or connecting elements are formed. Thus, the cross section of the hollow profiled section is additionally reinforced.

In yet another preferred embodiment, the groove-like exterior recesses or the projections are disposed in the transition areas.

In accordance with yet another embodiment of this invention, the clear distance between two oppositely located screw channels is less than the thickness of a cable or bundle of cables to be inserted. As a result the cables or bundles of cables can be locked into the individual chambers.

In accordance with another embodiment of this invention, the clear distance between two screw channels is greater than the thickness of an inserted cable. In this case, separating elements for fixing a cable or bundle of cables in position can be inserted into the installation conduit. In this way, the chambers can be selectively closed off from each other.

In accordance with one embodiment, the separating elements comprise a bar, on the ends of which two support elements are fastened which are positively supported in the screw channels, and the separating elements can be inserted or snapped into the support arm in the direction of its longitudinal axis.

BRIEF DESCRIPTION OF THE DRAWINGS

The above-mentioned and additional features and objects of this invention will be better understood from the following detailed description taken in conjunction with the drawings, wherein.

DESCRIPTION OF PREFERRED EMBODIMENTS

Figure 1:
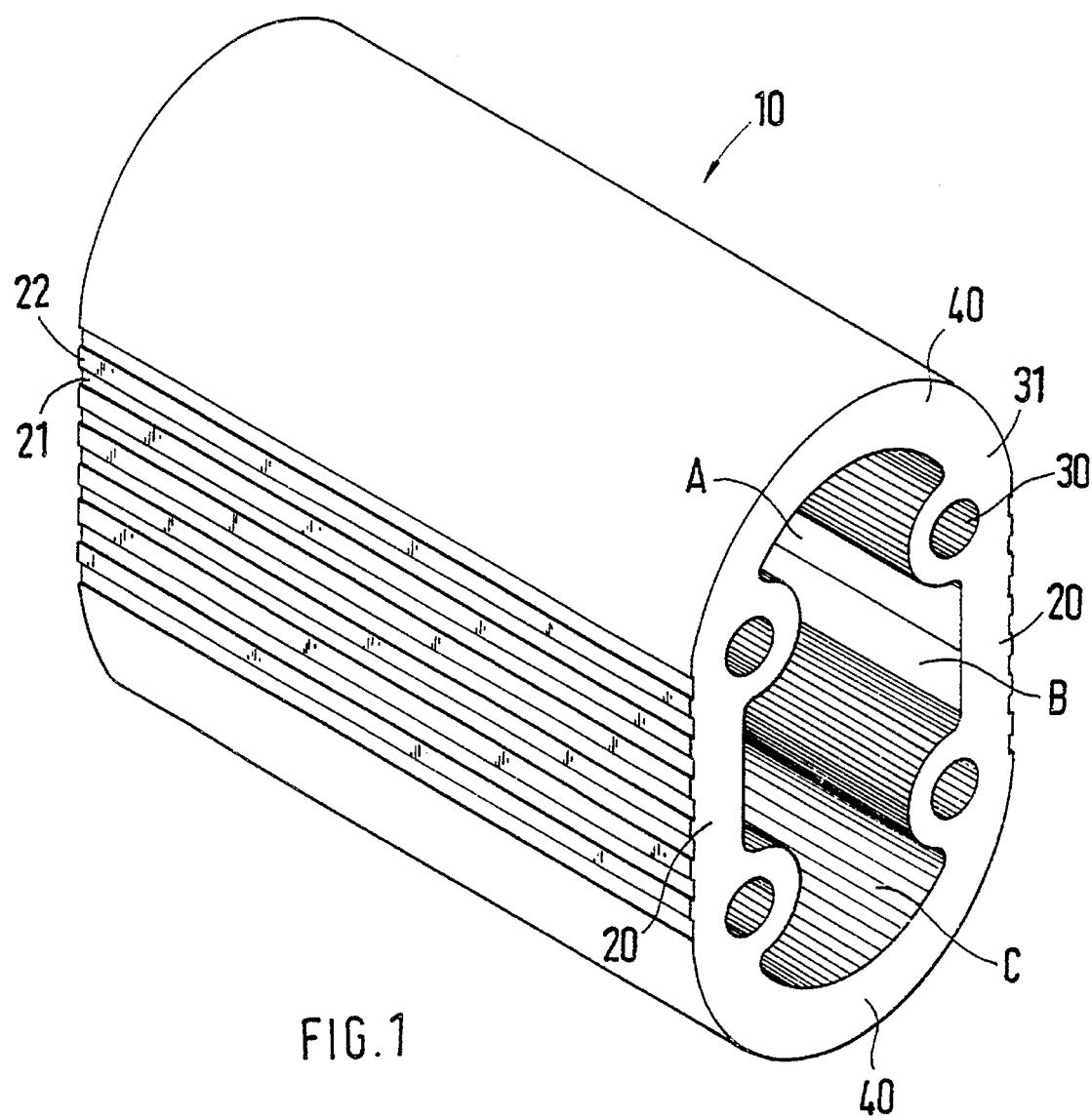
FIG. 1 is a perspective view of a hollow profiled section which can be used as a support arm in accordance with one preferred embodiment of this invention.

A closed hollow profiled section 10 is shown in FIG. 1. The hollow profiled section 10 comprises two lateral walls 20 which are parallel to each other at a distance and which are connected to each other by semicircular connecting elements 40. Screw channels 30 projecting from the inside of the hollow profiled sections 10 are formed in one piece with the hollow profiled sections 10 in the transition areas 31, which are formed without a break and where the lateral walls 20 make a transition into the connecting elements 40. The screw channels 30 extend continuously in the longitudinal direction of the hollow profiled section 10, so that the profiled section 10 can be produced as an extruded profiled section, for example as an extruded profiled section of aluminum.

The screw channels 30 divide the interior of the hollow profiled section 10, which are enclosed by the lateral walls 20 and the connecting elements 40, into three chambers A, B and C. The chambers A and C are partitioned off between the two upper or the two lower oppositely positioned screw channels 30 and the associated connecting element 40. The center chamber B is formed between the chambers A and C, and is also defined by the screw channels 30.

Figure 2:
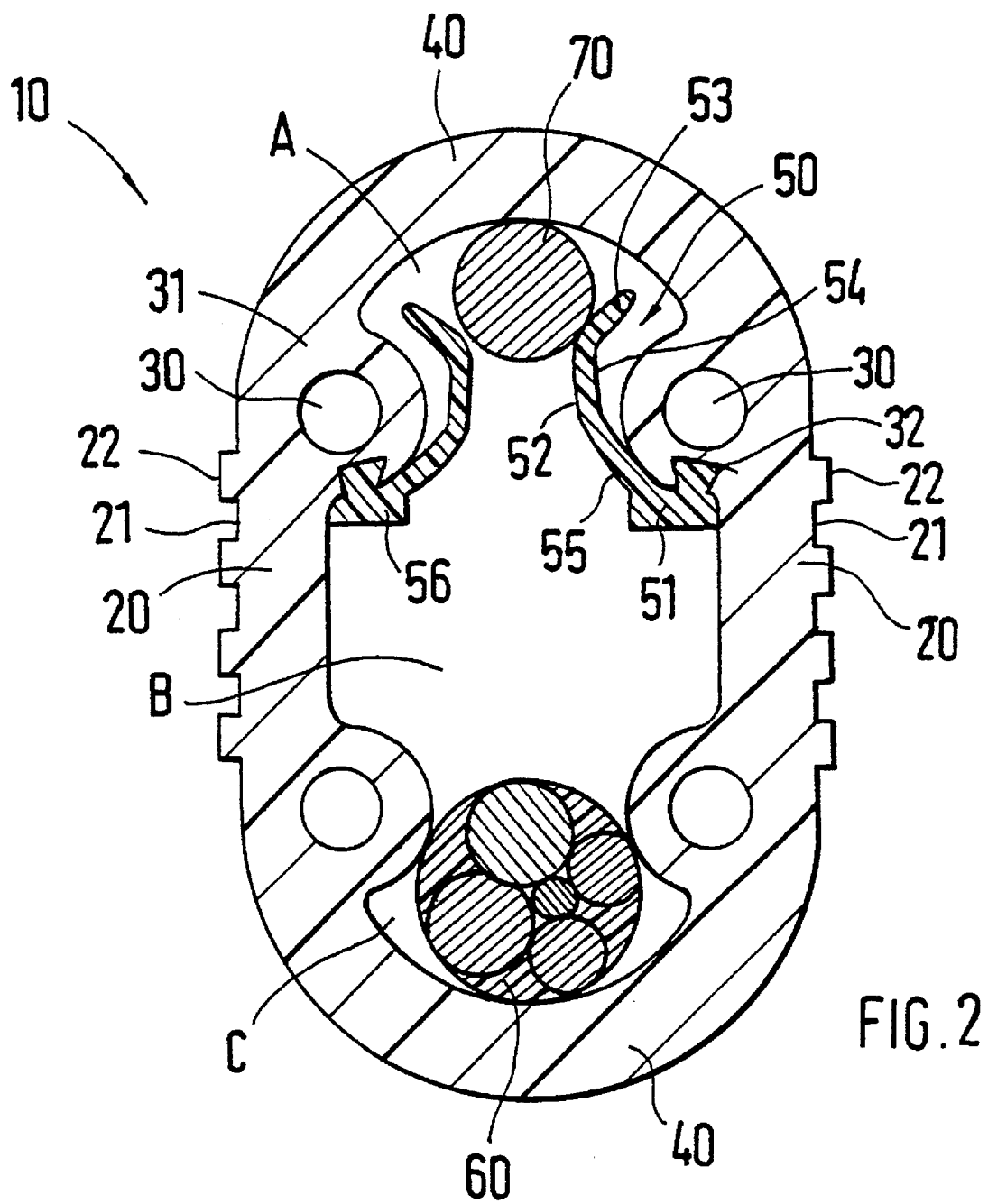
FIG. 2 shows a cross-sectional view of the hollow profiled section of FIG. 1, including a separating element.

The hollow profiled section 10 is shown in cross section in FIG. 2. The three chambers A, B and C are in communication with each other. The upper and the lower chambers A and C are dome-shaped as a result of the arc-shaped connecting elements 40, so that the cross-sectional area of the chambers A and C is enlarged and cables 70, bundles 60 of cables or the like can be easily received.

The clear distance between the two lower screw channels 30 is preferably such that a bundle 60 of cables, which has a greater thickness than the clear distance between the two associated screw channels 30, can be pressed into the chamber C and secured therein. To press the bundle 60 of cables into the chamber C over the entire length of the hollow profiled section 10, a rod-shaped insertion tool is employed, with which the bundle 60 of cables can be simultaneously inserted and pressed into the dome-shaped chamber C. This procedure can be used when the support arm is assembled at the factory. For assembly at the site of the customer, however, the bundle 60 of cables can be inserted into the hollow profiled section 10 and only pressed in at the ends.

Because of this, when two bundles 60 of cables which appear identical are used, the user is no longer faced with the difficulty of associating the bundle of cables at the two ends of the hollow profiled section. Thus, the expensive checking of the bundles 60 of cables can be omitted.

The upper chamber A can be closed off from the center chamber B by a separating element 50. The separating element 50 comprises a bar 51, on the ends of which support elements 52 have been positioned. The support elements 52 are arc-shaped in cross section and partially enclose the screw channels 30, so that the separating element 50 is positively maintained on the screw channels 30. The separating element 50 is pushed into a hollow profiled section 10 in the longitudinal direction from the front end of the hollow profiled section 10 over its entire length or alternatively, in particular in case of short hollow profiled sections 10, is snapped into the hollow profiled section 10. It is then possible to introduce the cables 70, which have a smaller diameter than the clear distance between the two screw channels 30 into the chamber A. It is also possible that the cables 70 be fastened on the separating elements 50 and both the cables 70 and the separating elements 50 be inserted together into the hollow profiled section 10.

Outwardly extending projections 22 are positioned on the lateral walls 20 of the hollow profiled section 10. The projections 22 extend in the shape of flanges in the longitudinal direction of the hollow profiled section 10, as can be seen in FIG. 1. Grooves 21 are formed between the individual projections 22. It is possible to attach additional installation or stiffening elements to the projections 22 or in the grooves 21. The projections 22 and the grooves 21, in accordance with one preferred embodiment of this invention are square in cross section. However, other cross-sectional shapes are obviously conceivable.

We claim:

1. In a support arm for a control device having a plurality of profiled walls which enclose an installation conduit for receiving cables, the improvement comprising: a plurality of screw channels (30) projecting inwardly and extending in a longitudinal direction of a profiled section of said support arm and positioned in the installation conduit, said profiled section comprising two lateral walls (20) disposed parallel to each other at a distance and two semicircular connecting elements (40) in the shape of an oval connecting the ends of said two lateral walls (20), and the screw channels (30) dividing the installation conduit into a plurality of chambers (A, B, C) which are in communication with each other.

2. In a support arm in accordance with claim 1, wherein each of the two lateral walls (20) makes a transition into each of the two semicircular connecting elements (40) and at least one of said screw channels (30) is disposed in each transition area (31).

3. In a support arm in accordance with claim 2, wherein a plurality of exterior recesses (21) in the form of grooves extending in the longitudinal direction of the profiled section are formed by at least one of the lateral walls (20) and the semicircular connecting elements (40).

4. In a support arm in accordance with claim 2, wherein a plurality of outwardly extending projections (22) are positioned on at least one of the lateral walls (20) and the semicircular connecting elements (40).

5. In a support arm in accordance with claim 3, wherein at least one of the plurality of exterior recesses (21) and a plurality of outwardly extending projections (22) are positioned in each of said transition areas (31).

6. In a support arm in accordance with claim 5, wherein a plurality of separating elements (50) for securing a cable (70) or bundle (60) of cables in position is inserted into the installation conduit.

7. In a support arm in accordance with claim 6, wherein the plurality of separating elements (50) each comprise a bar (51) having two ends, on which two support elements (52) are secured, each separating element (50) being secured in a groove formed on the periphery of the screw channels (30), and each separating element (50) being inserted into the support arm (10) in a direction of the support arm's longitudinal axis.

8. In a support arm in accordance with claim 1, wherein a plurality of exterior recesses (21) in the form of grooves extending in the longitudinal direction of the profiled section are formed by at least one of the lateral walls (20) and the semicircular connecting elements (40).

9. In a support arm in accordance with claim 1, wherein a plurality of outwardly extending projections (22) are positioned on at least one of the lateral walls (20) and the semicircular connecting elements (40).

10. In a support arm in accordance with claim 9, wherein at least one of the plurality of exterior recesses (21) and a plurality of outwardly extending projections (22) are positioned in each of a transition area (31) where said two lateral walls (20) are connected to said two semicircular connecting elements (40).

11. In a support arm in accordance with claim 1, wherein a plurality of separating elements (50) for securing a cable (70) or bundle (60) of cables in position is inserted into the installation conduit.

12. In a support arm in accordance with claim 11, wherein the plurality of separating elements (50) each comprise a bar (51) having two ends, on which two support elements (52) are secured, each separating element (50) being secured in a groove formed on the periphery of the screw channels (30), and each separating element (50) being inserted into the support arm (10) in a direction of the support arm's longitudinal axis.

\* \* \* \* \*